C. OLSSON.
STORAGE BATTERY.
APPLICATION FILED APR. 3, 1919.
1,386,895.
Patented Aug. 9, 1921.
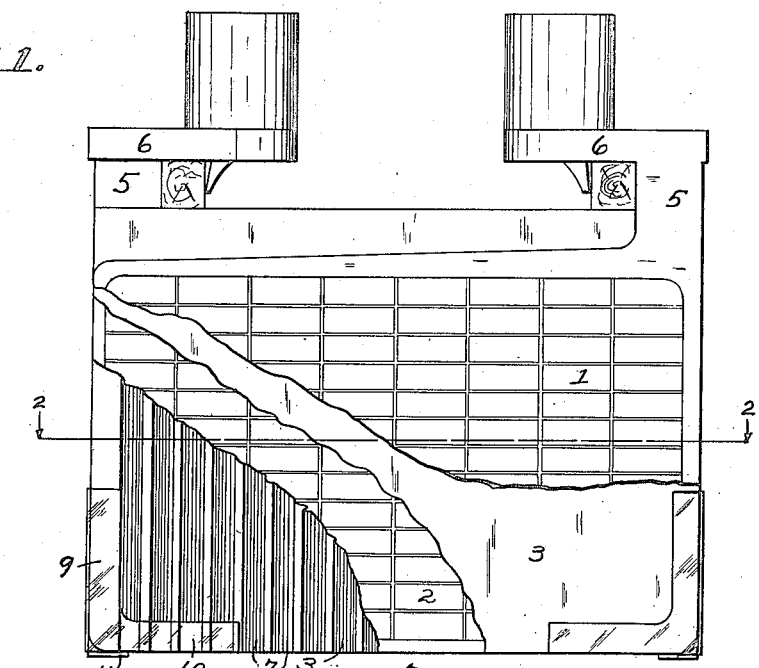
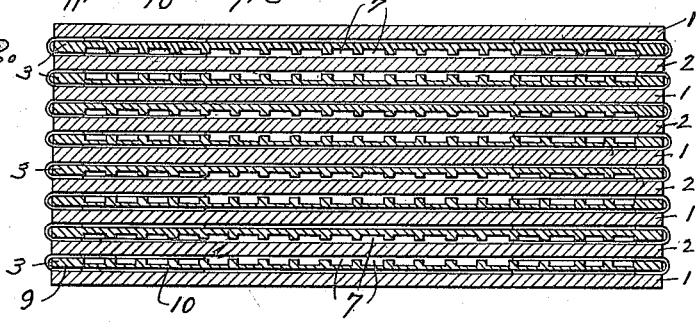
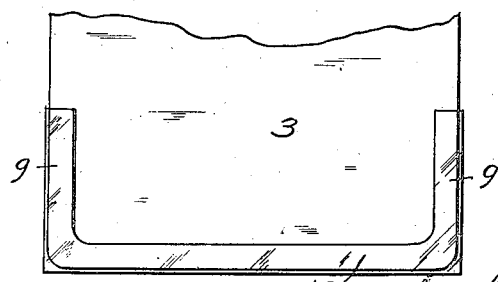
Witness
Inventor
Charles Olsson
By Erwin Wheeler & Woolard
Attorneys

UNITED STATES PATENT OFFICE.

CHARLES OLSSON, OF MILWAUKEE, WISCONSIN.

STORAGE-BATTERY.

1,386,895. Specification of Letters Patent. Patented Aug. 9, 1921.

Application filed April 3, 1919. Serial No. 287,200.

*To all whom it may concern:*

Be it known that I, CHARLES OLSSON, a citizen of the United States, residing at Milwaukee, county of Milwaukee, and State of Wisconsin, have invented new and useful Improvements in Storage-Batteries, of which the following is a specification.

My invention relates to improvements in storage batteries.

The object of my invention is to increase the durability of the battery by protecting the separator plates at the points where the deterioration is most rapid, and securing this protection without impairing the efficiency of the battery. I have discovered that the separating plates deteriorate most rapidly at the two lower corners, this being due in part to the fact that the electrodes usually warp in such a manner as to exert excessive pressure upon the separator plates at these corners, and in part to the fact that any vibration to which the battery may be subjected develops rubbing contacts at these corners to a greater extent than in any other portion of the plate. An examination of a large number of batteries in which the electrodes have become short circuited, discloses the fact that in nearly all of them the short circuit develops by erosion and disintegration of one or both of the lower corners of the separating plates, and that frequent short circuits are developed at these points at times when the battery is otherwise still in very good condition. An estimate, based upon my personal experience in the examination and the repair of batteries, is that by protecting the lower corners of the separator plates, the life of an ordinary battery may be prolonged from twenty-five to fifty per cent. in excess of the average period of existence for batteries of the same type as heretofore constructed. This result, however, can only be attained by providing a form of protection which will not clog the separator channels, or otherwise catch and hold the waste material dropping from the electrode plates during the operation of the battery, and my invention therefore has for its specific object the provision of means for protecting the corners of the separator plates without obstructing their channels, and without any material increase in the gap between the positive and negative electrode plates.

In the drawings:—

Figure 1 is a side elevation of a battery unit, having its plates successively broken away to expose one positive and one negative plate, with an intervening separator plate having its lower corners protected in accordance with my invention.

Fig. 2 is a sectional view of the same, drawn on line 2—2 of Fig. 1.

Fig. 3 is a bottom view of the protecting member.

Fig. 4 is a side elevation, on a reduced scale, of the units shown in Fig. 1, illustrating a modified form of construction.

Like parts are identified by the same reference characters throughout the several views.

The positive and negative electrodes 1 and 2, and the intervening separator plates 3 may be of any ordinary construction, the electrode plates illustrated having the form of grids suspended by arms 5 from the terminal plates 6, and the separator plates 3 being formed of wood provided with vertically extending channels 7, and these wooden plates being held between the grids or electrode plates by frictional contact. In construction and arrangement, all of these parts may be regarded as conforming to established practice.

But it will be observed that I have interposed a thin celluloid strip between each of the separator plates and the grids or electrode plates between which the separator plate is suspended. This celluloid strip covers the lower portion of the side faces of each separator plate along the unchanneled margin thereof, and in the form illustrated in Figs. 1, 2 and 3, this strip extends inwardly for a short distance along the lower margin of the separator plate, the protecting strip being substantially L-shaped in form, with a vertically extending portion 9, and a horizontally extending portion 10.

As shown in Fig. 1, the protecting strips on the respective sides of the separator plate are integrally connected with each other around the vertical side edges of the separator plate, the piece of celluloid from which the strips are formed comprising a blank having a little more than twice the width of the vertically extending arm 9, whereby this portion of the blank may be folded along its vertically extending median line until it embraces the edge of the plate, and until the horizontal arms 10 extend along the respective sides of the plate. Thereupon the strip may be pushed into position between the electrodes and the separator plates, whereupon the plates will be held in position by the frictional contact with the electrodes, and by the clamping effect secured by thus folding the protecting strips about the separator plate margins.

I also preferably provide the blank from which the protecting strips are formed with a projecting ear 11, which may be folded underneath the margin 7 of the separator plate to facilitate positioning the protecting strip at the corner by preventing it from sliding upwardly along the plate while the parts are being assembled, or when the elements are being inserted in the jar.

It will be observed that the portions 9 of the protecting strips are sufficiently narrow so that they do not cover the channel in the separator plate which is nearest to the margin. The horizontally extending portions 10 do extend across these channels, but these portions 10 are narrow in the vertical dimension, and the channels being open at the bottom the waste material thrown off by the electrodes will readily drop through the channels to the bottom of the cell. It is obvious that if the electrodes warp or twist out of shape while in use, it will not be possible for them to injure or destroy the corners of the separator plates, since the protecting strips are interposed between these corners, (the lower corners of the plates), and the strips thereby protecting the plates against excessive pressures at one point, and also against friction.

While I have described the protecting strips as being formed of celluloid, I do not limit the scope of my invention to this specific material. Any suitable insulating material may be used if sufficiently thin to avoid a material increase in the gap between the electrode plates, and particularly if the material used is smooth surfaced, and not subject to disintegration or chemical action in the liquid contents of the battery.

In Fig. 4. I have illustrated a form of construction in which the lower margins of the electrodes and separator plates are held out of contact throughout their length by an interposed protecting strip 15, also composed of celluloid or equivalent material, and which may be anchored to either the electrode or the separator plates in any suitable manner. These strips 15 necessarily cross the channels in the separator plates, but they are thin, smooth surfaced and narrow in the vertical dimension, and therefore afford little opportunity for lodgment of waste material from the electrodes, or of fiber from the separator plates. The vibration of the plates when the battery is employed in connection with a motor driven vehicle or any other vehicle where vibratory movements are possible, will also assist very materially in preventing lodgment of waste material on these interposed strips. But I prefer the construction illustrated in Fig. 1, in which the portions 10 of the protecting strips constitute free arms, the inner ends of which are unconnected and free to vibrate when the separator plates and electrodes swing apart in vibratory movement.

In the construction shown in Fig. 4, the strips 15 are anchored by folding their respective ends about the side margins of one of the plates in a manner quite similar to that disclosed in Figs. 1 and 2. It is not very material whether they are provided with anchoring ears corresponding with the ears 11, for the reason that the length of the strips in the construction shown in Fig. 4 will make it very unlikely that the strips will be pushed upwardly from their proper position between the lower margins of the plates.

I claim:—

1. In a battery, the combination with the electrode plates and separator plates, of a set of protecting strips interposed between the lower corner portions of the separator plates and the corresponding portions of the electrode plates, and unconnected with each other at the bottom, whereby waste material is not retained by said protecting strips.

2. In a battery, the combination with the electrode plates and a vertically channeled separator plate, of a protecting member formed of insulating material folded about the side margins of the separator plate and contacting with both sides of the separator plate, with the lower margins of the channeled portions of the plate uncovered and the channels open.

3. In a battery, the combination of electrode plates and separator plates; of protecting members each positioned about the corner margins of the separator plates and protecting both sides of the separator plates at the corners thereof from contact with the electrode plates; said protecting members having inwardly projecting arms interposed between the lower margins of the separator and electrode plates, said arms being connected solely at their side margins, and an ear formed at the lower portion of said protecting member.

4. In a battery the combination with the electrode plates and separator plates, of protecting members each folded about the side margins of the separator plates and protecting both side margins of these separator plates at the corners thereof from contact with the electrode plates, and having inwardly projecting arms interposed between the separator plates and the electrode plates along the lower margins of the plates, said protecting members being composed of insulating material, and said arms being free from connection with each other except at the vertical marginal portions, whereby waste material is allowed to pass freely between the said arms and fall to the bottom of the battery.

5. A protecting member for storage battery separator plates comprising a celluloid strip having parallel spaced arms free from connection with each other along their lower edges and having an upwardly extending channel member formed at right angles to said arms, said protecting member arranged to engage the opposite sides of the separator plates adjacent their lower corners and to move with said separator plates to prevent abrasion of said separator plate.

In testimony whereof I affix my signature in the presence of two witnesses.

CHARLES OLSSON.

Witnesses:
 A. J. McKerihan,
 Leverett C. Wheeler.